United States Patent Office 3,263,762
Patented August 2, 1966

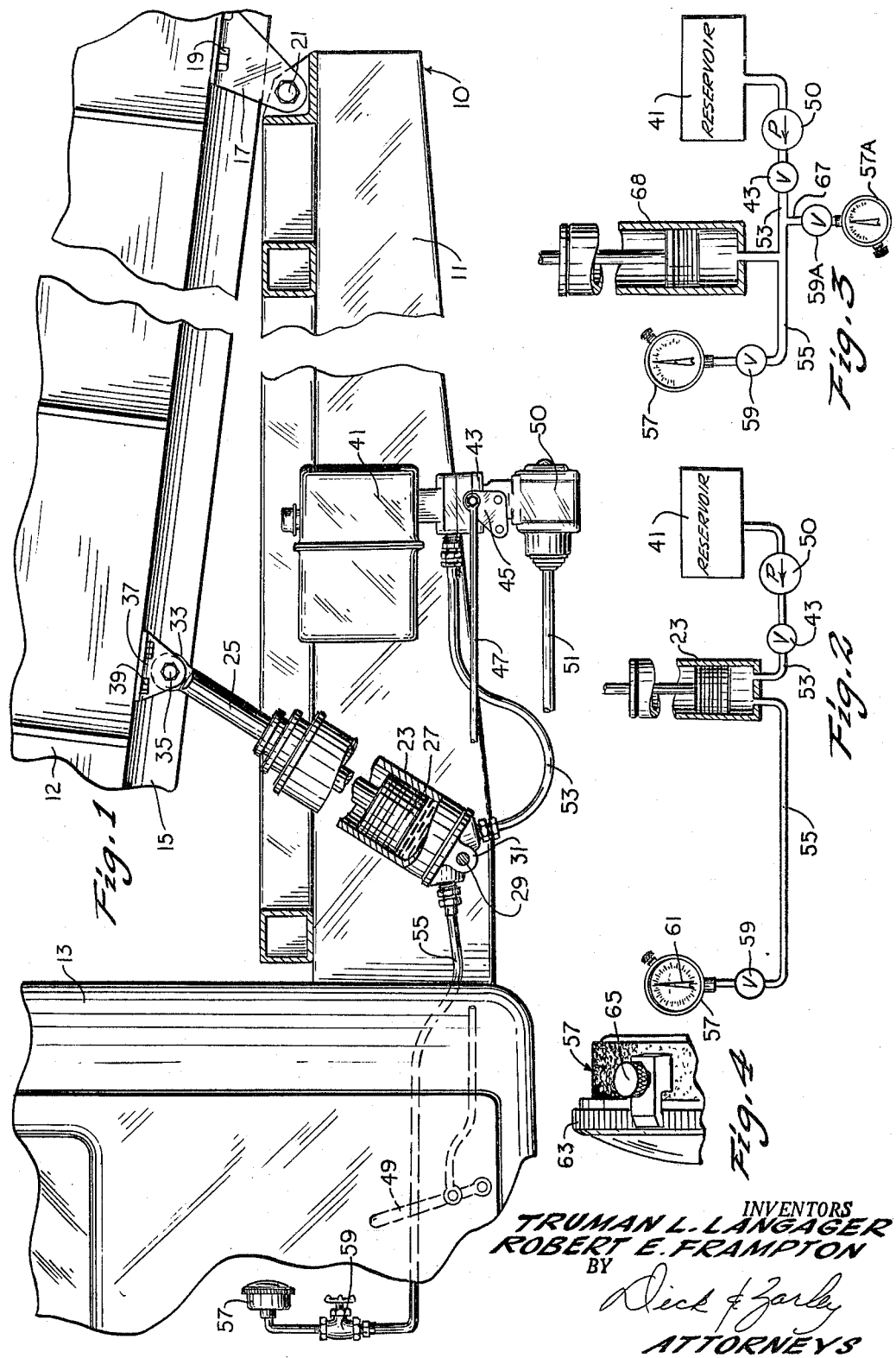

3,263,762
LOAD WEIGHER INCORPORATED INTO HYDRAULIC SYSTEM OF VEHICLE WEIGHING DEVICE
Truman L. Langager, 522 N. Main, Osceola, Iowa, and Robert E. Frampton, 3100 34th Place, Des Moines, Iowa
Filed Mar. 11, 1964, Ser. No. 351,081
5 Claims. (Cl. 177—141)

This invention relates to a vehicle load weighing apparatus and more particularily to a load weighing apparatus incorporated into the hydraulic system used in raising and lowering the bodies of such vehicles.

Load restrictions are quite frequently placed on both primary and secondary road systems. As a result, truck drivers must be extremely careful to avoid overloading their trucks. It is obviously inefficient to carry less than a maximum load on the trucks, but it is expensive and time consuming to return to the loading area from the weighing station when it is discovered that less than the maximum load has been placed on the vehicle. Therefore, it is desirable to carry maximum loads but this can be accomplished only on a trial and error basis unless the "overloads" and "underloads" are compensated for after each scale weighing.

Additionally it is sometimes desirable to be able to determine the approximate weight of material unloaded at a particular site. This is true when a large truck has several tons of material on its bed and is to deliver equal amounts to different locations.

While there are some weighing devices incorporated into a truck design these systems are extremely elaborate and require much fabrication and alteration of the vehicle and its component parts.

Therefore, a principal object of this invention is to provide a load weighing apparatus which is incorporated into the conventional hydraulic system of the vehicle, and which quickly and accurately indicates the weight of the load placed on the truck without the necessity of external scale means.

A further object of this invention is to provide a load weighing apparatus which accurately facilitates the unloading of various weights of material.

A further object of this invention is to provide a load weighing apparatus which may be simply incorporated into the design of the existing structure without extensive fabrication or alteration of the vehicle and its component parts.

A further object of this invention is to provide a load weighing apparatus which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary side elevational view of the device mounted on a vehicle;

FIG. 2 is a schematic drawing illustrating the hydraulic flow system;

FIG. 3 is a schematic drawing illustrating an alternate version of the hydraulic flow system; and FIG. 4 is a fragmentary side elevational view of the locking means on a pressure gauge.

The numeral 10 generally designates a vehicle having a frame 11, body 12, and cab 13. A bed 15 having a fulcrum 17 secured thereto intermediate its length by means of bolts 19 is pivotally secured to frame 11 by means of hinge pin 21. A hydraulic cylinder 23 having an extendable piston rod 25 secured to an interior piston 27 is pivotally secured to frame 11 by means of pin 29 extending through eyelet 31 of cylinder 23. Pin 29 is supported by any conventional bearing means (not shown). Eyelet 33 of piston rod 25 is pivotally secured to bed 15 by means of pin 35 extending through bracket 37 and eyelet 33. Bracket 37 is secured to bed 15 by means of bolts 39.

A fluid reservoir 41 is secured to frame 11 by any convenient means along its length. A valve assembly 43 is operatively secured to the lower end of reservoir 41 by any convenient means. Valve assembly 43 is of the three-way variety and is externally controlled by means of lever 45 which is operatively connected to the inner mechanism thereof. An elongated rod 47 is pivotally secured at its rearward end to lever 45 and to lever 49 in cab 13 at its forward end. A pump 50 is operatively secured to the lower portion of valve assembly 43 by any convenient means. A drive shaft 51 extends from the vehicle power take off (not shown) and is operatively connected to pump 50.

Secured to the base of hydraulic cylinder 23 is a conduit 53 which extends to valve assembly 43. A conduit 55 is connected to the base of hydraulic cylinder 23 and extends to a pressure gauge 57 in cab 13. A cut off valve 59 is imposed in conduit 55.

FIG. 3 illustrates an alternate form of the load weighing apparatus. It will be noted that only one conduit 67 is connected to the base of cylinder 68. Conduits 53 and 55 are connected to conduit 67 which eliminates the necessity of two ports in cylinder 68. Many hydraulic cylinders have only a single port in their base and the alternate form illustrated in FIG. 3 eliminates the necessity of drilling a second port in cylinder 68 when the alternate form of the load weighing device is used, a second pressure gauge 57A may be installed in conduit 53 if so desired. If this is done, a second cut off valve 59A will also be installed in conduit 53 between pressure gauge 57A and hydraulic cylinder 68.

The normal method of operation is as follows. Vehicle 10 will be loaded to its maximum permissible weight by placing weight such as crushed rock, dirt, gravel, sand, etc. in body 12. It is necessary to weigh the truck on a conventional truck scale during this phase of the operation. When the conventional truck scale indicates that the maximum permissible weight has been reached the vehicle 10 may leave the weighing area if so desired. Hydraulic cylinder will then be activated by engaging the vehicle power take off to actuate pump 50 by means of drive shaft 51. Cut off valve 59 in conduit 55 will be in a closed position. Valve assembly 43 will be moved to an operating or lifting position by moving lever 49, which is operatively connected thereto. By placing valve assembly 43 in this lifting position while pump 50 is operating, fluid will be forced into hydraulic cylinder 23 by means of conduit 53. Valve assembly 43 will be caused to remain in this position until piston rod 25 has extended itself to a position whereby it has caused bed 15 to be pivotally raised from frame 11 such as illustrated in FIG. 1. The bed 15 needs to be raised only slightly to cause the fluid in the cylinder and in conduit 53 to be under this load pressure. Valve assembly 43 will then be placed in its neutral or closed position. Cut off valve 59 will then be opened so that the pressure gauge 57 will be in communication with the interior of hydraulic cylinder 23 by means of conduit 55. The weight of bed 15, body 12 and its contained material will cause downward pressure on piston rod 25 which in turn exerts pressure on piston 27. The resulting pressure on piston 27 causes fluid pressure to be built up in the lower interior part of the cylinder as well as in conduits 53 and 55. Indicator needle 61 will be caused to rotate to some position on gauge 57. Therefore, this position of indicator needle 61 represents the pressure exerted thereon when the vehicle is loaded to its maximum weight. Dial face means 63 may then be rotated to a relative position with respect to indicator needle 61 and locked at that position by means of lock means 65. The dial face means would usually have markings thereon to indicate maximum load or the like. The vehicle should preferably be on level terrain during this period of operation and during all such weighing operations. This will contribute to the accuracy of the weighing. Body 12 would then be lowered in the conventional fashion. Thereafter, any time the vehicle is being loaded and a maximum weight must not be passed the following steps will be observed: Bed 13 will be raised to a position whereby it is raised from frame 11 exactly as described in the initial calibration of pressure gauge 57. Cut off valve 59 will be in an open position and valve assembly means 47 in a neutral position. The truck will be loaded until indicator needle reaches the previously calibrated point on dial face means 63 which indicates that the maximum load has been reached. Body 12 and bed 13 will then be lowered by placing valve assembly 47 in a position to retract piston rod 25. Cut off valve 59 will usually be in a closed position except during the actual gauge reading period to prevent unnecessary wear or damage to the gauge. The vehicle bed can be completely lowered during the initial loading operation and then raised slightly to effect the above described weighing phenomenon.

As stated before, an optional gauge 57A may be installed in conduit 53 if so desired along with a cut off valve 59A. This allows the driver to read gauge 57A without the necessity of his being in the cab of the vehicle. The driver is often required to be outside of cab 13 to guide the loading means to the vehicle and such a gauge is merely a convenience to him. This construction requires less fabrication of the cylinder because the weighing means is tied into the pressure line rather than to the cylinder.

The system is very easily installed in existing hydraulic systems without any costly fabrication. Conduit 55 is simply connected to hydraulic cylinder 23 and extended into cab 13 where a cut off valve 59 and gauge 57 are installed. If gauge 57A is desired it is merely necessary to tap into the existing conduit 53. Therefore, the device can be installed in existing hydraulic systems in a matter of minutes without costly fabrication.

Gauge 57 not only provides a method for determining when the maximum weight has been reached but any intermediate weight as well. The dial face means 63 may be simply marked at any time during the calibration process to indicate various weights. The device herein disclosed is not only useful in the loading operations but in the unloading operations as well. For example, if the dial face means has been marked for various increments of weight in the same manner that the setting was determined for the maximum weight, the operator can dump a partial load, and then by lowering the bed to a slightly tilted position, the remaining load can be weighed according to the above procedure. The amount of the original load which was dumped can then be determined by merely subtracting the weight of the remaining load from weight of the original load. Therefore, it is seen that this invention will accomplish at least all of its stated objectives.

Some changes may be made in the construction and arrangement of our Load Weighing Device without departing from the real spirit and purpose of our invention, and it is our intention to cover by our claims, any modified forms of structure or use of mechanical equivalents which may be reasonably included within their scope.

We claim:

1. In combination,
a vehicle having a frame and a cab,
a bed pivotally secured intermediate its length to said frame,
a hydraulic cylinder pivotally secured to said frame,
said hydraulic cylinder having an extendable piston rod secured to an interior piston, said piston rod being pivotally secured to said bed whereby its extension will raise said bed from said frame,
a hydraulic pressure responsive means in said cab,
a first conduit secured to said hydraulic cylinder at the base of said hydraulic cylinder and being hydraulically connected to said pressure responsive means in said cab,
a pump means for extending and retracting said piston rod,
a second conduit secured to said hydraulic cylinder at the base thereof and being connected to said pump means,
and a second pressure responsive means in said second conduit, each of said first and second pressure responsive means indicating the load carried by said bed when said hydraulic cylinder has raised said bed from said frame.

2. In combination,
a vehicle having a frame and a cab,
a bed pivotally secured intermediate its length to said frame,
a hydraulic cylinder pivotally secured to said frame,
said hydraulic cylinder having an extendable piston rod secured to an interior piston, said piston rod being pivotally secured to said bed whereby its extension will raise said bed from said frame,
a hydraulic pressure responsive means in said cab,
a first conduit secured to said hydraulic cylinder at the base of said hydraulic cylinder and being hydraulically connected to said pressure responsive means in said cab,
a pump means for extending and retracting said piston rod,
a second conduit secured to said hydraulic cylinder at the base thereof and being connected to said pump means,
a second pressure responsive means in said second conduit, each of said first and second pressure responsive means indicating the load carried by said bed when said hydraulic cylinder has raised said bed from said frame,
and a cut off valve in said first conduit.

3. In combination,
a vehicle having a frame and a cab,
a bed pivotally secured intermediate its length to said frame,
a hydraulic cylinder pivotally secured to said frame,
said hydraulic cylinder having an extendable piston rod secured to an interior piston, said piston rod being pivotally secured to said bed whereby its extension will raise said bed from said frame,
a hydraulic pressure responsive means in said cab,
a first conduit secured to said hydraulic cylinder at the base of said hydraulic cylinder and being hydraulically connected to said pressure responsive means in said cab,
a pump means for extending and retracting said piston rod,
a second conduit secured to said hydraulic cylinder at the base thereof and being connected to said pump means,
a second pressure responsive means in said second conduit, each of said first and second pressure responsive means indicating the load carried by said bed when said hydraulic cylinder has raised said bed from said frame,
a first cut off valve in said first conduit,
and a second cut off valve in said second conduit.

4. In combination,
a vehicle having a frame and a cab mounted thereon, a bed pivotally secured intermediate its length to said frame, a hydraulic cylinder pivotally secured to said frame, said hydraulic cylinder having an extendable piston rod secured to an interior piston, said piston rod being pivotally secured to said bed whereby its extension will raise said bed from said frame, a first hydraulic pressure responsive means in said cab, a first conduit secured to said hydraulic cylinder at the base thereof and being hydraulically connected to said first pressure responsive means in said cab, a pump means secured to said frame, a second conduit secured to said hydraulic cylinder at the base thereof and connected to said pump means, a three-way valve in said pump means for controlling the flow between said pump means and said hydraulic cylinder, a second pressure responsive means in said second conduit, and a power means operatively connected to said pump means.

5. In combination, a vehicle having a frame and a cab mounted thereon, a bed pivotally secured intermediate its length to said frame, a hydraulic cylinder pivotally secured to said frame, said hydraulic cylinder having an extendable piston rod secured to an interior piston, said piston rod being pivotally secured to said bed whereby its extension will raise said bed from said frame, a first hydraulic pressure responsive means in said cab, a first conduit secured to said hydraulic cylinder at the base thereof and being hydraulically connected to said first pressure responsive means in said cab, a pump means secured to said frame, a second conduit secured to said hydraulic cylinder at the base thereof and connected to said pump means, a three-way valve in said pump means for controlling the flow between said pump means and said hydraulic cylinder, a second pressure responsive means in said second conduit, a power means operatively connected to said pump means, a first cut off valve in said first conduit, and a second cut off valve in said second conduit.

References Cited by the Examiner

UNITED STATES PATENTS

| | | | |
|---|---|---|---|
| 1,279,500 | 9/1918 | Berry | 60—52 |
| 2,147,536 | 2/1939 | Levy | 60—52 |
| 2,742,162 | 4/1956 | Mandt | 214—2 |
| 2,851,171 | 9/1958 | Martin et al. | 214—2 |
| 3,017,938 | 1/1962 | Polich | 177—141 |
| 3,154,160 | 10/1964 | Rockwell | 177—141 |

FOREIGN PATENTS 416,063  9/1934  Great Britain.

LOUIS J. CAPOZI, *Primary Examiner.*

LEO SMILOW, *Examiner.*

G. J. PORTER, *Assistant Examiner.*